(12) United States Patent
Condo

(10) Patent No.: US 11,703,112 B1
(45) Date of Patent: Jul. 18, 2023

(54) COMBINED LUG REACTION PLATE

(71) Applicant: Schaeffler Technologies AG & Co. KG, Herzogenaurach (DE)

(72) Inventor: Michael Condo, Clinton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/679,533

(22) Filed: Feb. 24, 2022

(51) Int. Cl.
*F16H 45/02* (2006.01)
*F16H 41/28* (2006.01)
*F16H 41/24* (2006.01)

(52) U.S. Cl.
CPC ............. *F16H 41/28* (2013.01); *F16H 45/02* (2013.01); *F16H 2041/243* (2013.01); *F16H 2045/0278* (2013.01)

(58) Field of Classification Search
CPC .. F16H 45/02; F16H 2045/0278; F16H 41/28; F16H 2041/243
See application file for complete search history.

(56) References Cited

U.S. PATENT DOCUMENTS 2,707,887 A * 5/1955 Slack ...................... F16H 47/08
477/64
3,255,642 A * 6/1966 Christenson ............ F16H 47/08
477/121

* cited by examiner

*Primary Examiner* — Huan Le
(74) *Attorney, Agent, or Firm* — Volpe Koenig

(57) ABSTRACT

A torque converter assembly is disclosed that includes a front cover, a clutch plate assembly, a pump cover, and a plate including a base body extending in an axial direction with a first flange on a first end and a second flange on a second end. The first flange can define a friction face configured to engage with a corresponding surface of the clutch plate assembly, and the second flange can define at least one opening configured to receive a fastening element. In one aspect, the plate functions or serves as a reaction plate for the clutch assembly, and also serves as a connection or lug for a flex plate or other component.

19 Claims, 4 Drawing Sheets

COMBINED LUG REACTION PLATE

FIELD OF INVENTION

The present disclosure relates to a torque converter assembly, and more particularly relates to a plate configured as a reaction plate and a connection for a flex plate.

BACKGROUND

Torque converter assemblies are well known. Torque converter assemblies generally include a front cover and a pump cover. Within these outer components, a clutch plate assembly can be provided, among other components. A reaction plate or friction plate is required for clutch plate assemblies. It is generally known to provide a separately formed reactor plate that is contained within the pump cover and front cover. Torque converter assemblies also require a connection plate or lug along a radially outer region of the assembly for connecting the torque converter assembly with a flex plate. Connections between these various components can be complicated, and require significant labor costs and assembly time.

Accordingly, it would be desirable to provide an improved configuration for a torque converter assembly that provides manufacturing and assembly efficiencies.

SUMMARY

A torque converter assembly is disclosed herein that includes a plate having multiple functions or features. The torque converter assembly also includes a front cover, a clutch plate assembly, and a pump cover.

The plate includes a base body extending in an axial direction with a first flange on a first end and a second flange on a second end. The first flange defines a friction face configured to engage with a corresponding surface of the clutch plate assembly, and the second flange defines at least one opening configured to receive a fastening element.

A connection, such as a welded connection, can be provided at an interface between the plate and the front cover. Another connection, which can also include a welded connection, is provided at an interface between the plate and the pump cover.

The first flange can include at least one flow hole that defines a channel between an interior of the front cover and an interior of the pump cover. Multiple flow holes can be provided in the first flange, as one of ordinary skill in the art would appreciate from this disclosure.

The plate can be formed from stamped sheet metal, in one aspect. In another aspect, the plate can be stamped, and then further machined or processed to provide features such as openings, holes, threading or a friction surface.

In one aspect, a radially inner surface of the base body can define a support surface or guide surface for a radially outer surface of the front cover. This engagement between these surfaces can aid during assembly of the torque converter assembly.

The first flange can include a shoulder defining a support surface for a portion of the pump cover. This feature can also aid in the assembly and serve as a guiding surface.

The first flange can define a deadstop for engagement with an axial end of the front cover. The first flange can also define a deadstop for engagement with an axial end of the pump cover.

The first flange can extend in a radially inward direction and the second flange can extend in a radially outward direction, in one aspect. One of ordinary skill in the art would understand that the orientation of the flanges can vary.

Chamfered surfaces can be provided on the plate in relevant areas or regions that are configured to be connected to the front cover and the pump cover via welding.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
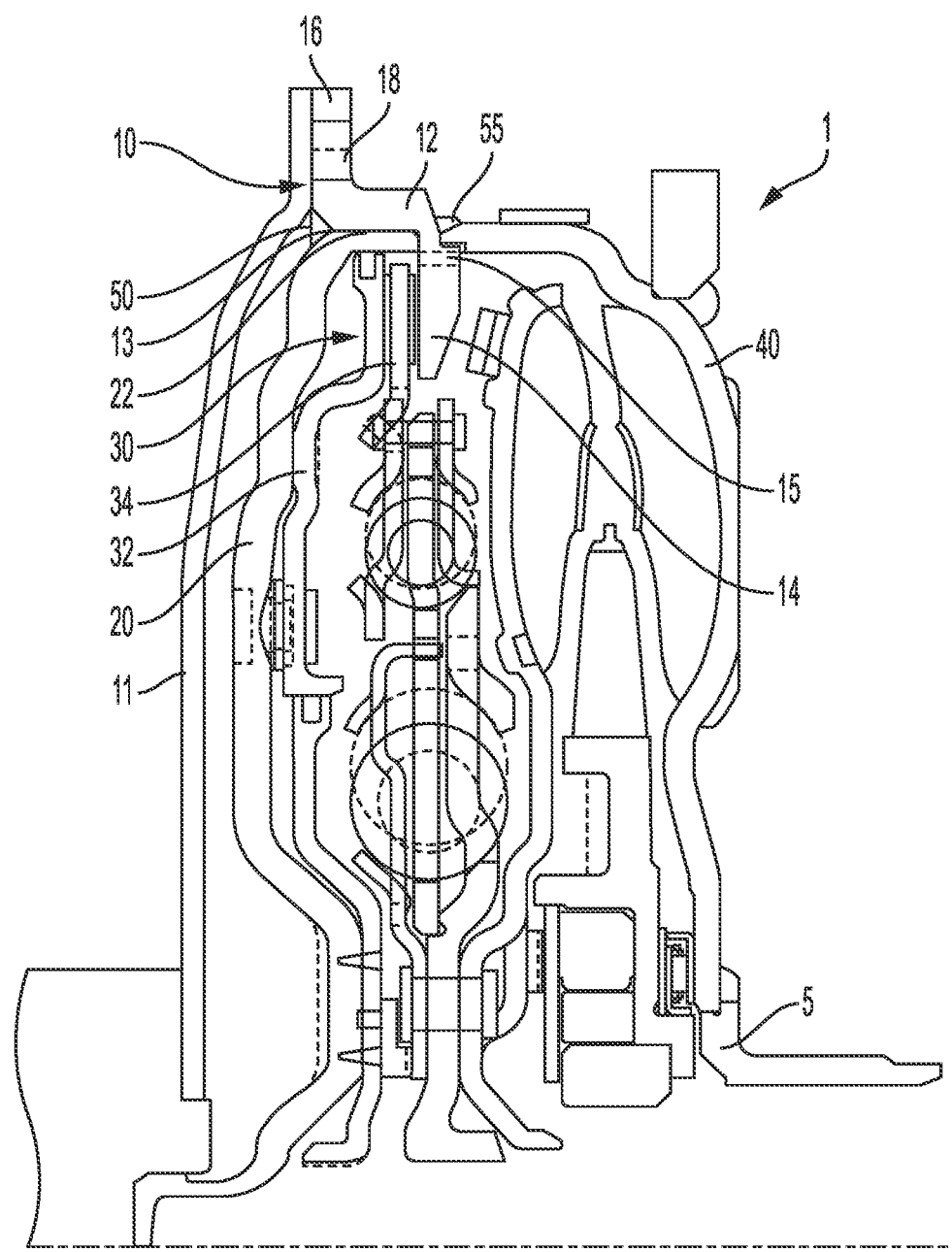
FIG. 1 is a cross-sectional view of a torque converter assembly according to one aspect.
Figure 2:
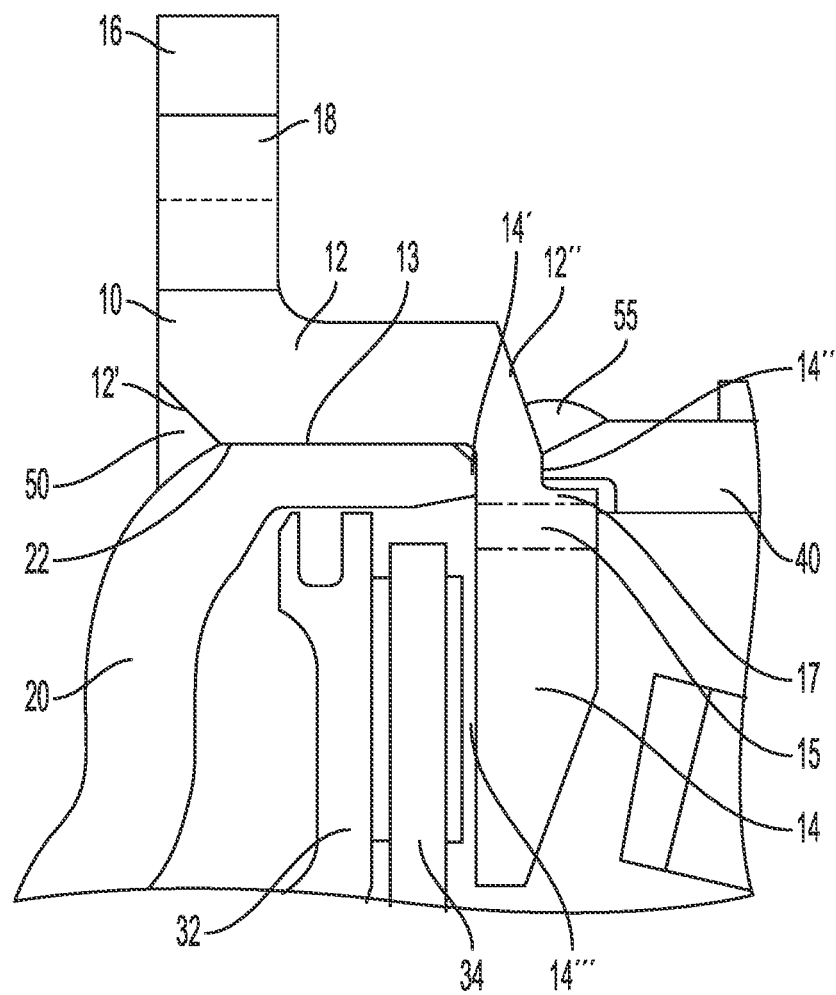
FIG. 2 is a magnified view of a portion of FIG. 1.

As shown in FIGS. 1 and 2, a torque converter assembly 1 is disclosed herein. The torque converter assembly 1 generally includes a plate 10, a front cover 20, a clutch plate assembly 30, and a pump cover 40.

The front cover 20 is configured to be attached to a flex plate 11 via a fastener or connector extending through an opening 18, such as a threaded opening, on the plate 10 and connecting the plate 10 to the flex plate 11. The front cover 20 can be connected to the piston plate 32 through a riveted leaf spring connection or other connection, and serves as a coupling between the engine and transmission.

The pump cover 40 partially defines a torus and is connected to a pump hub 5. The clutch plate assembly 30 can include a piston plate 32, at least one friction plate 34, and various friction coatings or friction surfaces.

Figure 3:
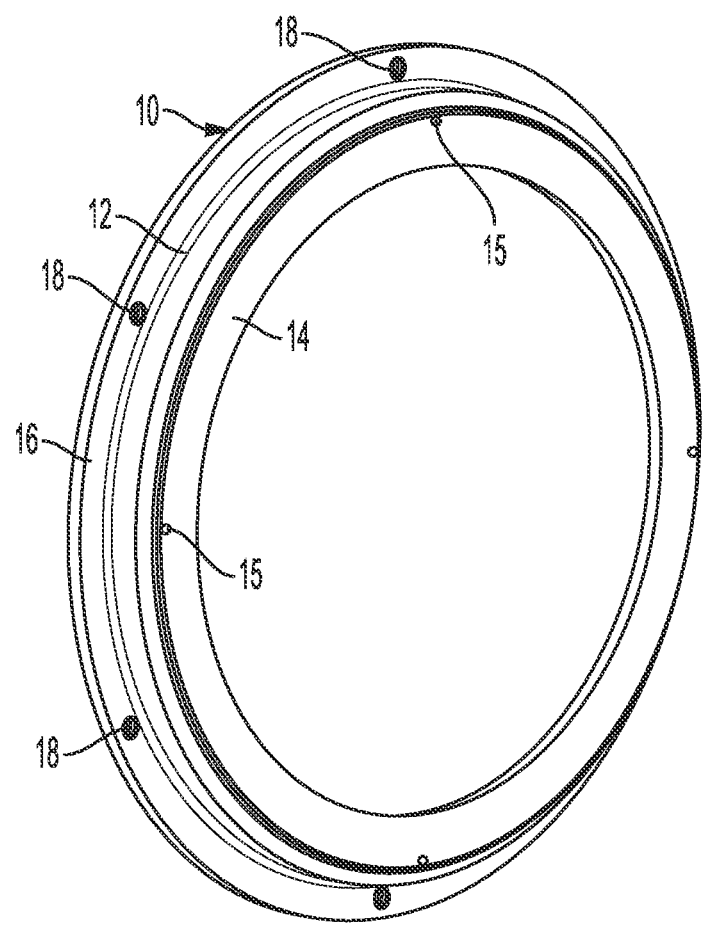
FIG. 3 is a perspective view of a plate of the torque converter assembly of FIGS. 1 and 2.

The plate 10, which is shown in perspective view in FIG. 3, includes a base body 12 extending in an axial direction with a first flange 14 on a first end and a second flange 16 on a second end. The plate 10 generally acts as both a lug feature, which provides a connection to a flex plate 11, and a reaction plate, which provides a friction surface or engagement surface for the clutch plate assembly 30.

The first flange 14 defines a friction face 14''' configured to engage with a corresponding surface of the clutch plate assembly 30, and the second flange 16 defines at least one opening 18 configured to receive a fastening element. The at least one opening 18 can include a plurality of openings 18, and each of the openings 18 can have a threaded profile for receiving a fastening element including a mating threading.

The friction face 14′′′ can include a machined surface that has a roughened surface. The friction face may also include a machined axial taper.

The first flange 14 can extend in a radially inward direction and the second flange 16 can extend in a radially outward direction, in one aspect. One of ordinary skill in the art would understand that configuration of the flanges 14, 16 can vary.

A connection 50 can be provided at an interface between the plate 10 and the front cover 20. In one aspect, the connection 50 can include a welded connection or feature. The connection 50 can include metal inert gas (MIG) welding, in one aspect.

A connection 55 can be provided at an interface between the plate 10 and the pump cover 40, in one aspect. The connection 55 can include a welded connection or feature, and can serve as a closure weld. The connection 55 can also include MIG welding, in one aspect.

One of ordinary skill in the art would understand that other types of connections can be provided for connections 50, 55. For example tungsten inert gas (TIG) welding, laser welding, or friction welding could be used.

The plate 10 can include chamfered surfaces 12′, 12′′ for each of the connections 50, 55. The chamfered surfaces 12′, 12′′ can provide improved surfaces for welding the respective areas of the plate 10 with the front cover 20 and the pump cover 40. In one aspect, the chamfered surfaces 12′, 12′′ provide for a more targeted or well-defined region for applying the welded connections as compared to a non-angled or non-chamfered surface. As shown in FIGS. 1 and 2, the chamfered surface 12′ faces a curved outer surface of the front cover 20, which defines a pocket for receiving the welded connection.

At least one flow hole 15 can be provided in the plate 10. For example, the first flange 14 can include the at least one flow hole 15. The flow hole 15 can define a fluid channel between an interior space within the front cover 20 and an interior space within the pump cover 40. The at least one flow hole 15 can include a plurality of flow holes that are circumferentially spaced apart from each other. The at least one flow hole 15 can be provided on the first flange 14 in a radially inward position relative to the front cover 20.

The plate 10 can be formed from stamped sheet metal, in one aspect. One of ordinary skill in the art would understand that other formation techniques and materials can be used to form the plate 10.

In one aspect, a radially inner surface 13 of the base body 12 can define a support surface for a radially outer surface 22 of the front cover 20. This radially inner surface 13 can serve as a centering diameter for assembly with the front cover 20.

The first flange 14 can include a shoulder 17 defining a support surface for a portion of the pump cover 40. The support surface on the shoulder 17 can be defined on a radially outer surface of the shoulder 17. The shoulder 17 can be formed as a change (i.e. reduction or increase) in thickness of the first flange 14, in one aspect. The shoulder 17 can also can serve as a centering diameter for assembly with the pump cover 40.

The first flange 14 can define a first deadstop 14′ for engagement with an axial end of the front cover 20. As used in this instance, the term deadstop refers to an abutment surface or area configured to engage or contact another component. In this configuration, the first deadstop 14′ is configured to provide a predetermined distance in which the front cover 20 can be axially inserted relative to the plate 10. Therefore, the first deadstop 14′ can serve to limit or set a clutch lift off value for the clutch assembly 30 due to the connection between the piston plate 32 and the front cover 20.

The first flange 14 also defines a deadstop 14′′ for engagement with an axial end of the pump cover 40. This deadstop 14′′ can be defined on an opposite axial side of the first flange 14 from the other deadstop 14′ for the front cover 20.

Figure 4:
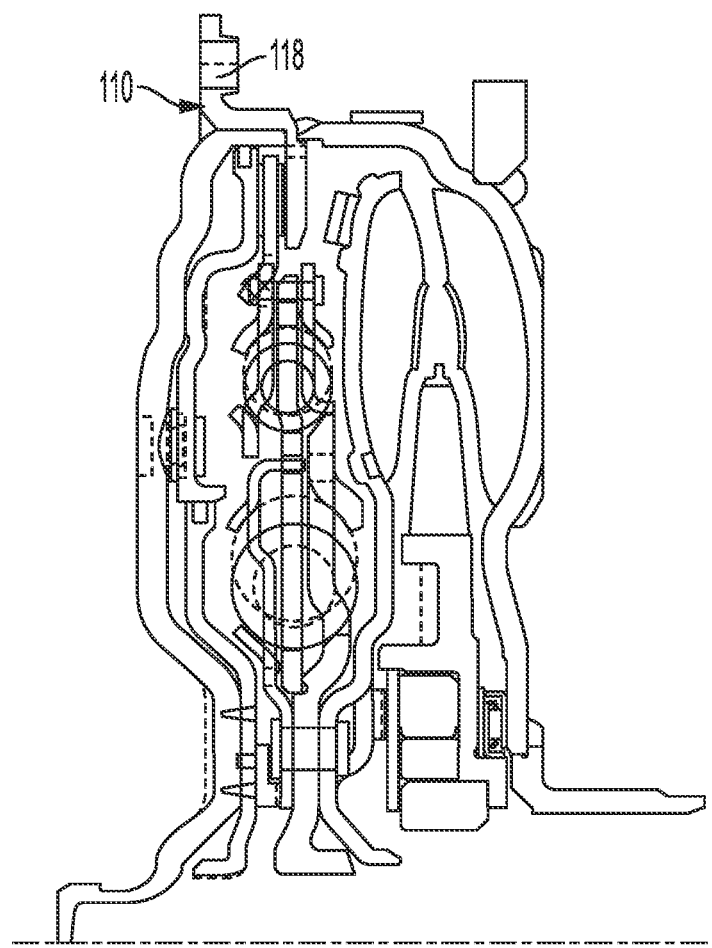
FIG. 4 is a cross-sectional view of a torque converter assembly including a plate according to another aspect.

As shown in FIG. 4, the plate 110 can have a varying geometry along a radially outer region. In particular, the at least one opening 118 configured to receive a fastener can be formed via flow drilling and tapped to provide a threading. The plate 110 can be formed via stamping and can have a relatively thin thickness as compared to known elements or plates used in torque converter assemblies. The plate 110 of FIG. 4 is otherwise identical to the plate 10 of FIGS. 1-3.

The plate disclosed herein provides manufacturing and assembly efficiencies, and reduces the number of components in the torque converter assembly, thereby simplifying the assembly process.

The plate disclosed herein can be formed via stamping, and subsequent steps of machining, such as the friction face, punching to form the openings or holes, and then welding to the adjacent components. The plate is formed as an integral component, in one aspect.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS torque converter assembly 1
pump hub 5
plate 10, 110
flex plate 11
base body 12
chamfered surfaces 12′, 12′′
radially inner surface 13 of the base body
first flange 14
deadstop 14′
deadstop 14′′
friction face 14′′′
flow hole 15
second flange 16
shoulder 17
opening 18, 118
front cover 20
radially outer surface 22 of the front cover 20
clutch plate assembly 30
piston plate 32
friction plate 34
pump cover 40
connection 50
connection 55

What is claimed is:

1. A torque converter assembly comprising:
a front cover;
a clutch plate assembly;
a pump cover; and
a plate including a base body extending in an axial direction with a first flange on a first end and a second flange on a second end, wherein the first flange defines a friction face configured to engage with a corresponding surface of the clutch plate assembly, and the second flange defines at least one opening configured to receive a fastening element;
wherein a connection is provided at an interface between the plate and the front cover; and
wherein the connection between the plate and the front cover includes a welded connection.

2. The torque converter assembly according to claim 1, wherein a connection is provided at an interface between the plate and the pump cover.

3. The torque converter assembly according to claim 2, wherein the connection between the plate and the pump cover includes a welded connection.

4. The torque converter assembly according to claim 1, wherein the first flange includes at least one flow hole that defines a channel between an interior of the front cover and an interior of the pump cover.

5. The torque converter assembly according to claim 1, wherein the plate is formed from stamped sheet metal.

6. The torque converter assembly according to claim 1, wherein a radially inner surface of the base body defines a support surface for a radially outer surface of the front cover.

7. The torque converter assembly according to claim 1, wherein the first flange includes a shoulder defining a support surface for a portion of the pump cover.

8. The torque converter assembly according to claim 1, wherein the first flange defines a deadstop configured to engage with an axial end of the front cover.

9. The torque converter assembly according to claim 1, wherein the first flange defines a deadstop configured to engage with an axial end of the pump cover.

10. The torque converter assembly according to claim 1, wherein the first flange extends in a radially inward direction and the second flange extends in a radially outward direction.

11. The torque converter assembly according to claim 1, wherein a second welded connection is provided at an interface between the plate and the pump cover, and the plate includes a first chamfered surface in a region of the welded connection and a second chamfered surface in a region of the second welded connection.

12. A torque converter assembly comprising:
a front cover;
a clutch plate assembly;
a pump cover; and
a plate including a base body extending in an axial direction with a first flange on a first end and a second flange on a second end,
the first flange defines a friction face configured to engage with a corresponding surface of the clutch plate assembly and the first flange defines at least one flow hole extending through the first flange, the second flange defines at least one opening configured to receive a fastening element, and a first connection is provided between the plate and the front cover and a second connection is provided between the plate and the pump cover.

13. The torque converter assembly according to claim 12, wherein the first and second connections are welded connections.

14. The torque converter assembly according to claim 12, wherein a first deadstop is defined on the first flange that is configured to abut against an axial end of the front cover, and a second deadstop is provided on the first flange that is configured to abut against an axial end of the pump cover.

15. The torque converter assembly according to claim 14, wherein the second deadstop is defined on a shoulder.

16. The torque converter assembly according to claim 12, wherein the first flange extends in a radially inward direction and the second flange extends in a radially outward direction.

17. The torque converter assembly according to claim 12, wherein a radially inner surface of the base body defines a support surface for a radially outer surface of the front cover.

18. The torque converter assembly according to claim 12, wherein the first connection includes a first welded connection and the second connection includes a second welded connection, and
the plate includes a first chamfered surface in a region of the first welded connection and a second chamfered surface in a region of the second welded connection.

19. A torque converter assembly comprising:
a front cover;
a clutch plate assembly;
a pump cover; and
a plate including a base body extending in an axial direction with a first flange on a first end and a second flange on a second end, wherein the first flange defines a friction face configured to engage with a corresponding surface of the clutch plate assembly, and the second flange defines at least one opening configured to receive a fastening element;
wherein a connection is provided at an interface between the plate and the pump cover; and
wherein the connection between the plate and the pump cover includes a welded connection.

* * * * *